United States Patent
Iwashita et al.

(10) Patent No.: US 8,006,538 B2
(45) Date of Patent: Aug. 30, 2011

(54) CONTROL DEVICE FOR SERVO DIE CUSHION

(75) Inventors: Yasusuke Iwashita, Fujiyoshida (JP);
Tadashi Okita, Fujiyoshida (JP);
Hiroyuki Kawamura, Yamanashi (JP);
Satoshi Ikai, Yamanashi (JP)

(73) Assignees: Fanuc Ltd, Yamanashi (JP); Komatsu Ltd., Tokyo (JP)

( * ) Notice: Subject to any disclaimer, the term of this patent is extended or adjusted under 35 U.S.C. 154(b) by 953 days.

(21) Appl. No.: 11/849,543

(22) Filed: Sep. 4, 2007

(65) Prior Publication Data
US 2009/0173131 A1 Jul. 9, 2009

(30) Foreign Application Priority Data
Sep. 5, 2006 (JP) .................................. 2006-240248

(51) Int. Cl.
*B21J 9/18* (2006.01)
(52) U.S. Cl. ........................................ 72/454; 72/443
(58) Field of Classification Search ............... 72/453.13, 72/454, 443
See application file for complete search history.

(56) References Cited

U.S. PATENT DOCUMENTS

| 7,049,775 | B2 * | 5/2006 | Iwashita et al. | 318/566 |
| 2006/0090656 | A1 * | 5/2006 | Iwashita et al. | 100/43 |
| 2006/0107724 | A1 * | 5/2006 | Iwashita et al. | 72/351 |

FOREIGN PATENT DOCUMENTS
JP 10-202327 A 8/1998
* cited by examiner

*Primary Examiner* — Edward Tolan
*Assistant Examiner* — Matthew G Katcoff
(74) *Attorney, Agent, or Firm* — Lowe Hauptman Ham & Berner LLP

(57) ABSTRACT

A control device, for a servo die cushion, by which the speed of a die cushion is prevented from largely deviating from the speed of a slide, whereby the press force between the slide and the die cushion is not significantly reduced. The control device includes a slide speed detector for detecting the speed of the slide, a die cushion speed detector for detecting the speed of the die cushion, and a die cushion speed commanding part for controlling the speed of the die cushion. When a tentative speed command of the die cushion is largely deviated from the detected slide speed, the command of the die cushion is corrected such that the absolute value thereof does not exceed the value calculated by adding the absolute value of the detected slide speed to a positive constant.

16 Claims, 12 Drawing Sheets

CONTROL DEVICE FOR SERVO DIE CUSHION

RELATED APPLICATIONS

The present application claims priority from Japanese Patent Application No. 2006-240248, filed on Sep. 5, 2006, the entire contents of which are fully incorporated herein by reference.

BACKGROUND OF THE INVENTION

1. Field of the Invention

The present invention relates to a control device for a servo die cushion which generates a force, on a slide of a press machine, using a servomotor as a drive source.

2. Description of the Related Art

It is known that a press machine, for bending, drawing or punching, etc., is provided with a die cushion mechanism, as an attached device, for applying a predetermined amount of force or pressure, to a movable support member (generally called a slide) supporting a first mold for press working, and force generated by another movable member supporting a second mold. The die cushion mechanism is generally configured such that the slide (or the first mold), moving in a mold-clamping direction, directly or indirectly collides with a movable element (generally known as a cushion pad) held at a predetermined pressure, and until the molding is finished, the cushion pad is moved with the slide while applying force or pressure to the slide. During this operation, it is possible to prevent wrinkles from forming in a workpiece to be pressed by, for example, clamping an area around a site of the workpiece to be pressed between the cushion pad and the slide.

Many conventional die cushion mechanisms use hydraulic or pneumatic units as driving sources. However, control by a hydraulic or a pneumatic unit can only be carried out under constant pressure. It is preferable that the pressure during drawing be varied in response to the amount of the drawing, however, the amount of pressure cannot be varied in the hydraulic or pneumatic unit.

In recent years, a die cushion mechanism using a servomotor as a driving source has been used to carry out force control, with a fast response, as described in Japanese Unexamined Patent Publication (Kokai) No. 10-202327. In the die cushion mechanism described in this publication, a cushion pad positioned below a slide of a press machine may be upwardly and downwardly moved by a servomotor, corresponding to the rise and fall of the slide. The servomotor operates by force control based on a force command value predetermined corresponding to the position of the cushion pad, and adjusts a force or pressure applied to the slide from the cushion pad, while moving the cushion pad with the slide. Collision and the pressure, between the slide and the cushion pad, are detected by detecting a load applied to an output axis of the servomotor via the cushion pad.

FIG. 12 is a graph showing ideal changes of the positions and the speeds of the slide and the die cushion (or the cushion pad), during a normal machining motion. First, the slide positioned at a top dead center thereof starts to go down (point "A"), collides with the die cushion positioned between the top dead center and a bottom dead center (point "B"), and reaches the bottom dead center with the die cushion (point "C"). Then the slide goes up and returns to the top dead center (point "D"). On the other hand, the die cushion starts to go up behind the slide (point "E"), and returns to an initial position thereof (point "F"). Such a series of operations are repeated. In FIG. 12, the speed of the slide and the die cushion when going up are represented as positive values.

In general, a speed command value for controlling the die cushion is calculated by one of the following equations:

$$\text{die cushion command speed} = (\text{force error}) \times (\text{force gain}) + (\text{slide speed}) \quad (1)$$

$$\text{die cushion command speed} = (\text{force error}) \times (\text{first force gain}) + \Sigma(\text{force error}) \times (\text{second force gain}) + (\text{slide speed}) \quad (2)$$

where the force error is a difference calculated by subtracting an actual force (or a detected force value) from a force command value between the slide and the die cushion.

In either of the above equations, an absolute value of the die cushion speed command is smaller than an absolute value of the slide (detected) speed, when the force command is larger than the detected force (i.e., the force error>0). In a reverse case (the force error<0), the absolute value of the die cushion speed command is larger than the absolute value of the slide speed. At this point, just after the slide collides with the die cushion, a large amount of force is applied to the die cushion and the above detected force is substantially increased. Therefore, the difference between the detected force and the command force is increased (i.e., command force<<detected force). In particular, when the force gain is set to a relatively large value for a fast response, the difference between the absolute values of the die cushion speed command and the slide speed becomes larger, accordingly (i.e., |die cushion speed command|>>|slide speed|). In such a way, as shown in FIG. 13 which is an enlarged view of a portion "X" of FIG. 12, the die cushion speed converges with the slide speed, while alternately repeating overshoot and undershoot motions. In FIG. 13, the ideal profile of the die cushion speed is omitted, and instead, the die cushion speed command is shown.

As described above, the workpiece to be machined is pressed between the cushion pad and the slide. Since predetermined machining cannot be performed when the press force is reduced, it is important to prevent the press force from being reduced, in controlling the die cushion. However, the die cushion speed command represents the profile as shown in FIG. 13, the actual speed or detected speed of the die cushion represents a graph as shown in the upper part of FIG. 14. Accordingly, the detected force between the slide and the die cushion represents a graph as shown in the lower part of FIG. 14. In such a way, as shown in portion "Y" of FIG. 14, in a certain period of time, the detected force may be substantially smaller than the command force. In this period of time, the workpiece is not pressed between the slide and the cushion pad by sufficient force, whereby expected machining cannot be achieved.

SUMMARY OF THE INVENTION

An object of the present invention is to provide a control device for a servo die cushion, by which the die cushion speed does not substantially diverge from the slide speed, whereby the press force between the slide and the die cushion is prevented from being reduced.

According to one aspect of the present invention, there is provided a control device for a servo die cushion, for controlling a die cushion which generates a force applied to a slide by using a servomotor as a driving source, the control device comprising: a slide speed detecting part for detecting the speed of the slide; and a die cushion speed commanding part for commanding the speed of the die cushion, wherein the die cushion speed commanding part generates a speed command of the die cushion such that an absolute value of a speed command of the die cushion is equal to or smaller than a threshold calculated based on an absolute value of the speed of the slide detected by the slide speed detecting part.

According to another aspect of the present invention, there is provided a control device for a servo die cushion, for controlling a die cushion which generates a force applied to a slide by using a servomotor as a driving source, the control device comprising: a slide speed commanding part for generating a speed command of the slide; and a die cushion speed commanding part for commanding the speed of the die cushion, wherein the die cushion speed commanding part generates a speed command of the die cushion such that an absolute value of a speed command of the die cushion is equal to or smaller than a threshold calculated based on an absolute value of the command speed of the slide generated by the slide speed commanding part.

The threshold may be calculated by adding a positive value to the absolute value of the detected slide speed or the command speed of the slide.

Alternatively, the threshold may be calculated by multiplying the absolute value of the detected slide speed or the command speed of the slide by a constant larger than one.

It is advantageous that the die cushion speed commanding part generates a speed command of the die cushion such that the absolute value of the speed command of the die cushion is equal to or smaller than a threshold which is equal to or slightly larger than the absolute value of the speed of the slide, only until a certain period of time after the collision between the slide and the die cushion.

The control device may further comprise a force commanding part for commanding a force to be generated between the slide and the die cushion, and a force detecting part for detecting the force generated between the slide and the die cushion. In this case, it is advantageous that the die cushion speed commanding part generates a speed command of the die cushion based on the summation of the product of a force gain and a force error, which is the difference between the force value detected by the force detecting part and the force command value generated by the force commanding part, and the product of the detected or command speed of the slide and a multiplier, the multiplier being smaller than one at the time of the collision between the slide and the die cushion and being set to converge with one as time advances.

BRIEF DESCRIPTION OF THE DRAWINGS

The above and other objects, features and advantages of the present invention will be made more apparent by the following description of the preferred embodiments thereof with reference to the accompanying drawings wherein.

DETAILED DESCRIPTION

The present invention will be described below, with reference to the drawings.

Figure 1:
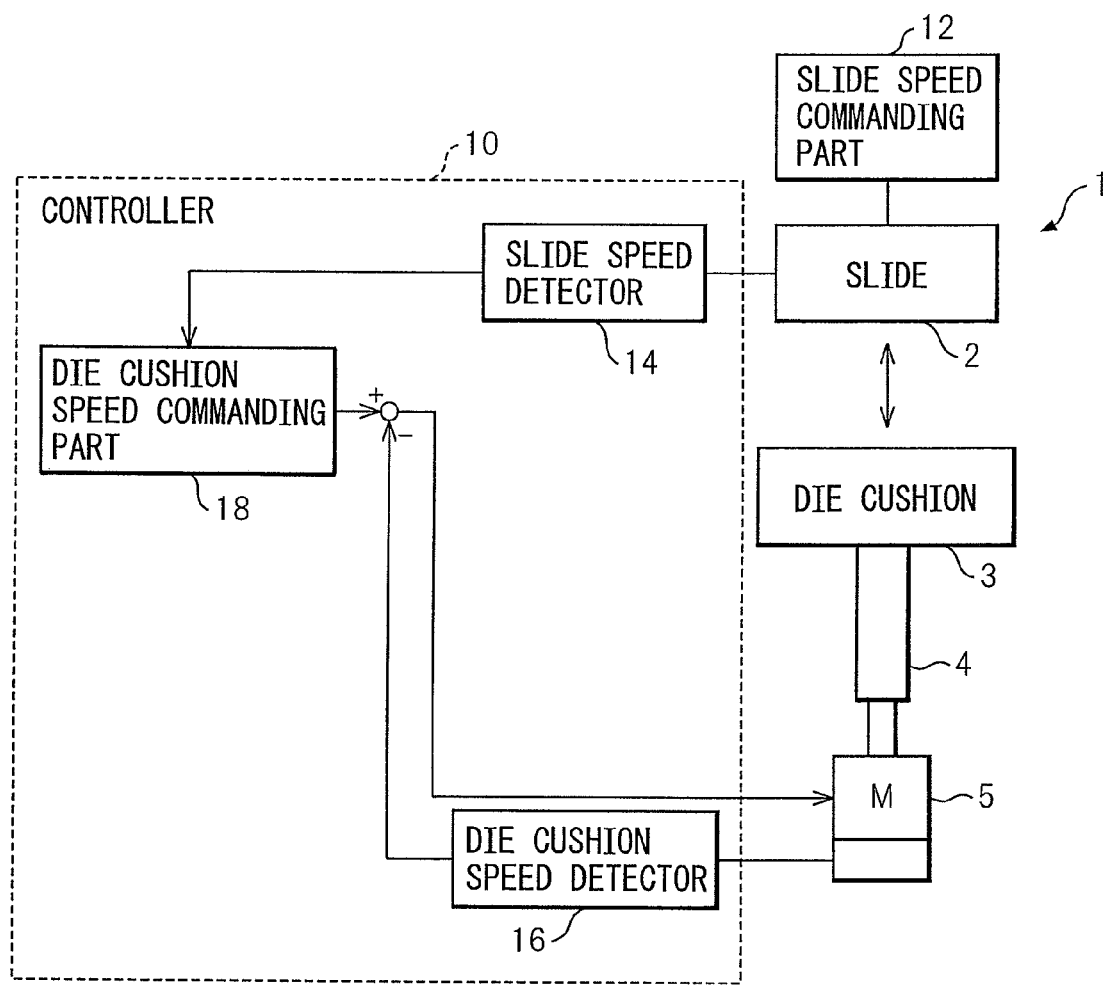
FIG. 1 shows a schematic configuration of a press machine including a control device for a servo die cushion according to a first embodiment of the invention.

FIG. 1 shows a schematic configuration of a press machine 1 including a control device or controller 10 for a servo die cushion according to a first embodiment of the invention. The press machine 1 includes a slide 2 driven by a link mechanism or the like (not shown) and a die cushion 3 configured to move corresponding to the motion of the slide 2. The position of die cushion 3 is sequentially controlled (in other words, the speed of the die cushion is controlled) by a servomotor 5 via a ball screw 4. The slide 2 may be controlled based on a command from a slide speed commanding part 12. The controller 10 for controlling the servomotor 5 includes a slide speed detecting part or a slide speed detector 14 for detecting the speed of the slide 2, a die cushion speed detecting part or a die cushion speed detector 16 for detecting the speed of the die cushion 3, and a die cushion speed commanding part 18 for generating a speed command of the die cushion 3.

Figure 2:
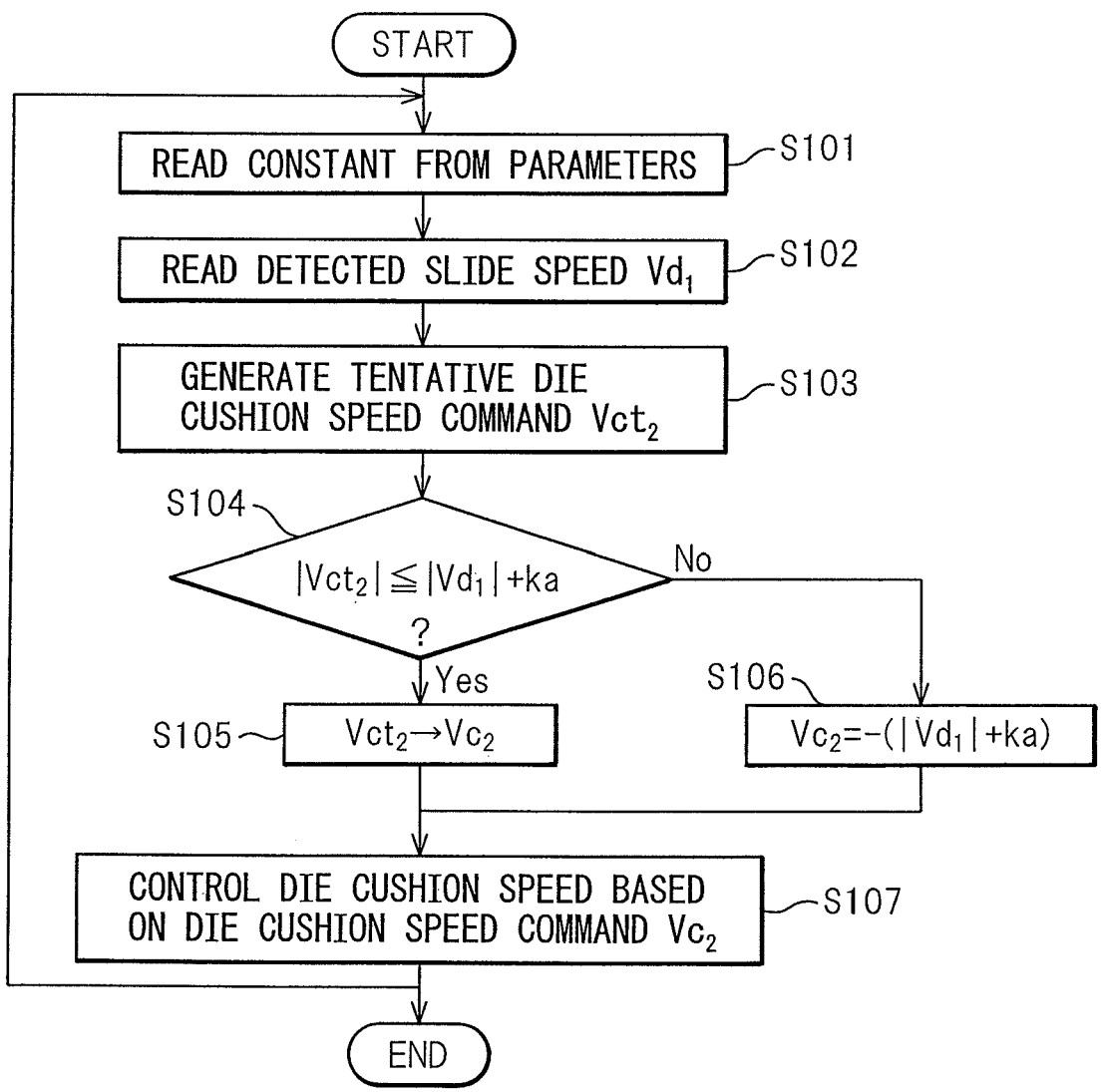
FIG. 2 is a flowchart showing a procedure of the control device of FIG. 1.

FIG. 2 is a flowchart indicating a procedure of the die cushion speed commanding part 18. First, in step S101, a positive constant ka is read from parameters stored in a memory or the like. Then, a detected speed value $Vd_1$ of the die cushion detected by the slide speed detector 14 is loaded (in step S102), and the die cushion speed commanding part 18 generates a tentative speed command $Vct_2$ of the die cushion (step S103). In the prior art, the tentative speed command would be directly used as a speed command of the die cushion. In addition, characters "c" and "d", included in a reference numeral indicating the speed, represent the command value and the detected value, respectively, and reference numerals including suffixes "1" and "2" represent values regarding the slide and the die cushion, respectively.

In the next step S104, an absolute value of $Vct_2$ is compared with a threshold which is calculated by adding a positive constant ka to an absolute value of $Vd_1$. When the absolute value of $Vct_2$ is equal to or smaller than the threshold (i.e., $|Vct_2| \leq |Vd_1| + ka$), the command speed of the die cushion is judged to be not largely different from the detected slide speed, the tentative speed command is directly used as the actual command speed $Vc_2$ of the die cushion in step S105. On the other hand, when the absolute value of $Vct_2$ is larger than the threshold (i.e., $|Vct_2| > |Vd_1| + ka$), the command speed of the die cushion is judged to be largely different from the detected slide speed, whereby the above mentioned overshoot or undershoot may occur. Therefore, the procedure progresses to step S106, in which the actual command speed Vc$_2$ of the die cushion is set to a value calculated by multiplying the threshold by minus one (i.e., Vc$_2$=−(|Vd$_1$|+ka)). At this point, the speed of the die cushion when going up is represented as a positive value. In the next step S107, the speed of the die cushion is controlled by the speed command generated in step S105 or S106. In this way, the procedure from S101 to S107 is repeated until a predetermined operation is completed.

Figure 3:
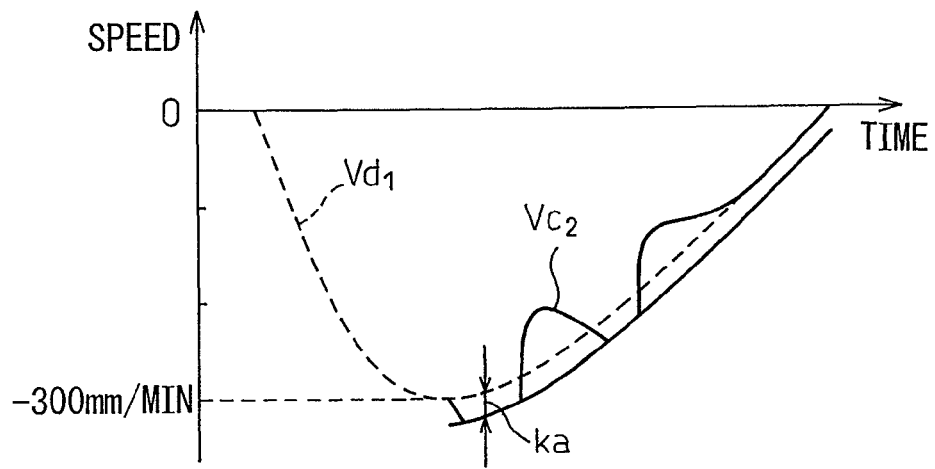
FIG. 3 is a graph showing the change of a speed command value of the die cushion obtained by the control device according to the first embodiment.
Figure 4:
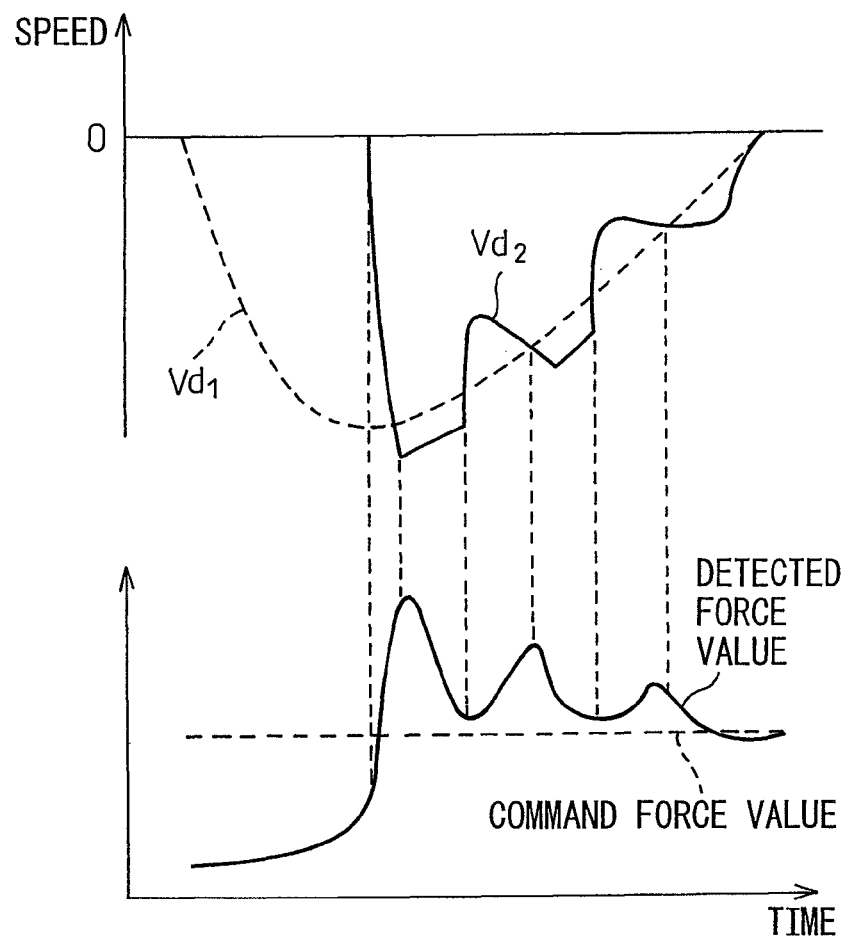
FIG. 4 is a graph showing the change of the detected speed of the die cushion and the detected force in the case of FIG. 3.
Figure 14:
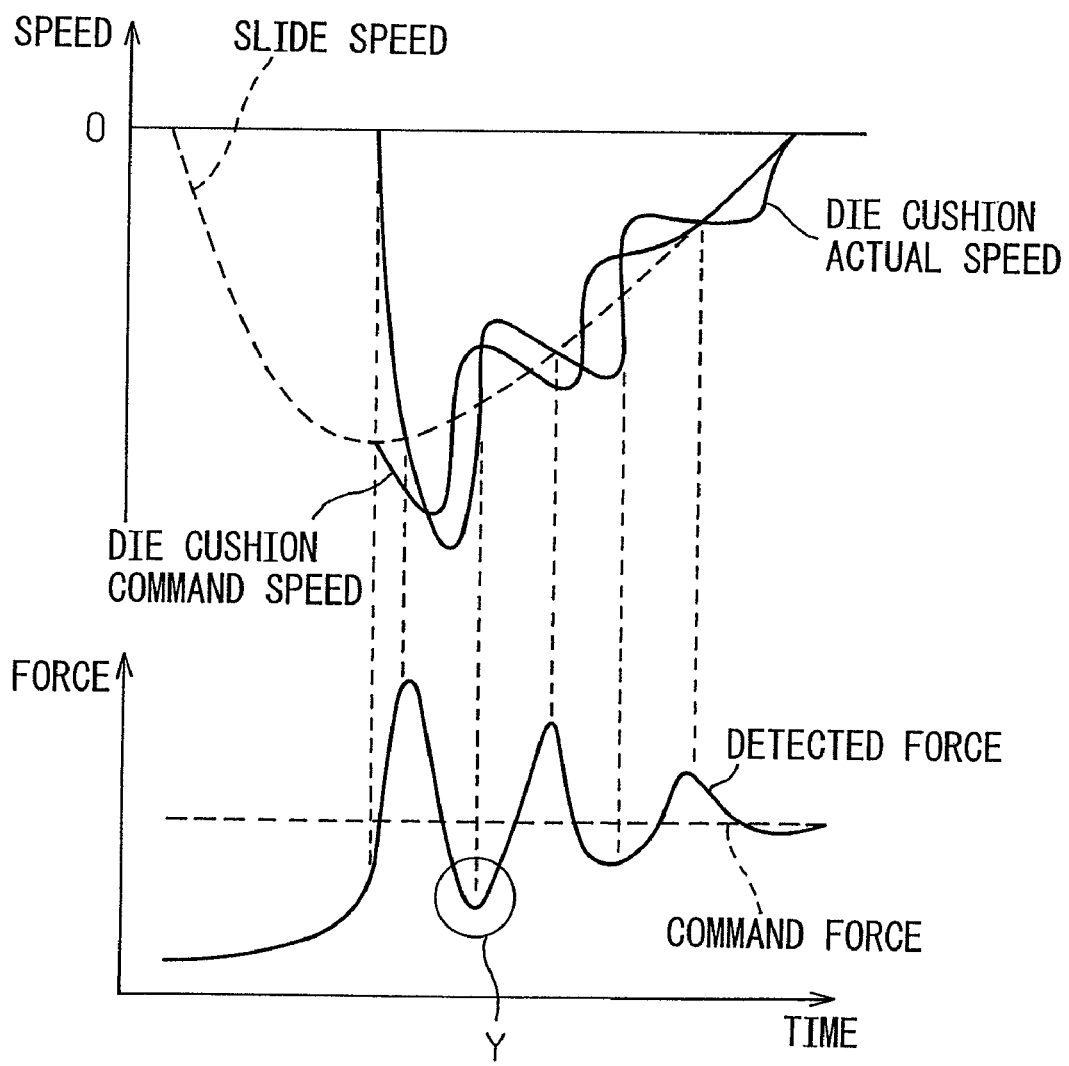
FIG. 14 is a graph showing the change of the actual speed of the die cushion and the detected force in the background art.

FIG. 3 is a graph showing one example of the change of the speed command value Vc$_2$ of the die cushion obtained by the control device according to the first embodiment. As described in step S106 of FIG. 2, if the tentative command speed Vct$_2$ of the die cushion is largely deviated from the detected speed Vd$_1$ of the slide for the reason that a gain is set too high, etc., the speed command value Vc$_2$ is limited or corrected such that the absolute value of Vc$_2$ does not exceed the value calculated by adding the constant ka to the absolute value of the detected speed Vd$_1$ of the slide. When the command speed Vc$_2$ presents such a profile as shown in FIG. 3, the detected speed Vd$_2$ of the die cushion does not largely deviated from the speed Vd$_1$ of the slide, as shown in FIG. 4. As a result, the period of time as shown in FIG. 14, in which the detected force is significantly smaller than a desired command force, does not occur. Accordingly, even when a gain is set to a relatively high value for a fast response, the workpiece may always be pressed between the slide and the die cushion by a force within a suitable range, whereby the desired press working may be performed. In other words, the invention is characterized in that the control is performed focusing on a magnitude relation between the speeds of the die cushion and the slide, rather than on setting the force error to zero after the collision between the slide and the die cushion as in the prior art.

The above constant ka may be zero (i.e., a magnitude relation between |Vct$_2$| and |Vd$_1$| is checked). However, the object of the invention may be achieved when the command speed of the die cushion is deviated from the detected speed of the slide to the extent that the force between the slide and the die cushion is not disadvantageously reduced. Therefore, the constant ka may typically be a positive value. The constant ka may be empirically determined. In the case of FIG. 3, for example, the maximum value of the absolute value of the slide speed Vd$_1$ is 300 mm/min, and the constant ka is preferably set to about one-tenth the maximum value. Accordingly, the preferable range of the constant ka in this case is between 10 and 50 mm/min.

Figure 5:
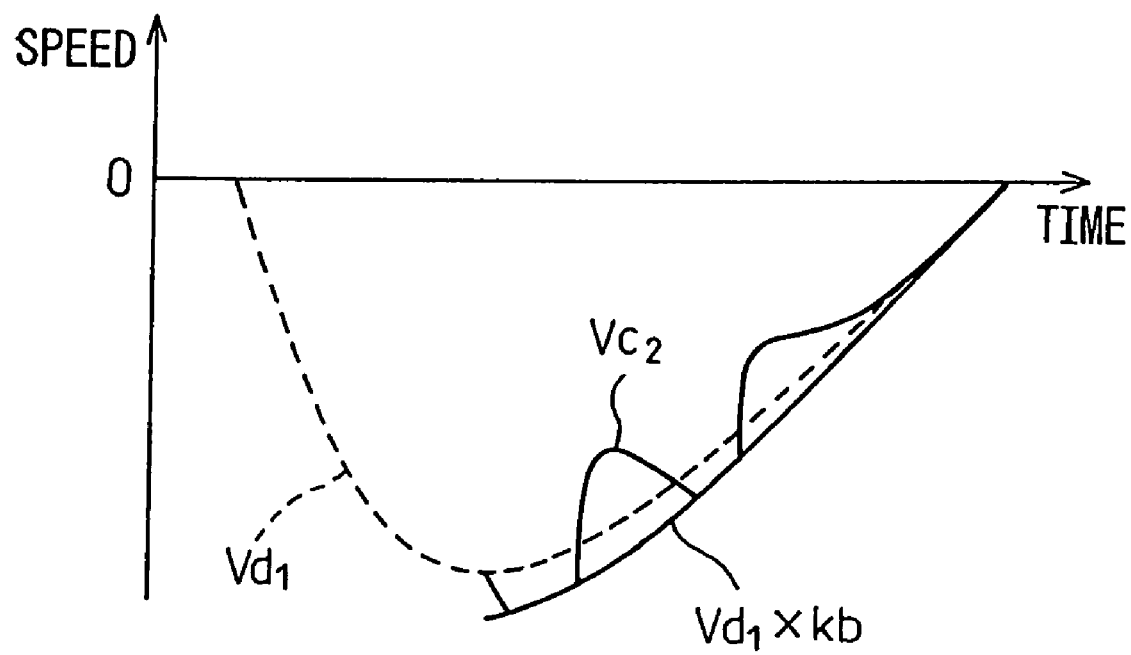
FIG. 5 is a graph showing a modification of FIG. 3.

In the first embodiment, the value, calculated by adding the constant ka to the absolute value of the speed Vd$_1$, is used as the threshold to be compared with the absolute value of the speed Vct$_2$. Alternatively, a value, calculated by multiplying the absolute value of the speed Vd$_1$ by another constant kb larger than one (for example, 1.05-2), may be used as the threshold. In this case, the change of the command speed of the die cushion is represented in FIG. 5. In other words, although the profile of the command speed of FIG. 5 is slightly different from the profile of FIG. 3 in the area where the slide speed Vd$_1$ comes close to zero (in the right area of the drawing), overshoot or undershoot of the die cushion speed is relatively small in this area. Therefore, the similar effect to the case of FIG. 3 can be obtained in the case of FIG. 5.

As described with reference to FIG. 14, the period of time, in which the detected force is significantly smaller than the desired command force, typically occurs just after the collision between the slide and the die cushion. Therefore, when a certain time has passed just after the collision, the above problem is not caused even if the control is performed focusing on setting the force error to zero after the collision as in the prior art. Accordingly, in a second embodiment as described below, a technique for specifying a period of time in which the speed command of the die cushion is limited.

Figure 6:
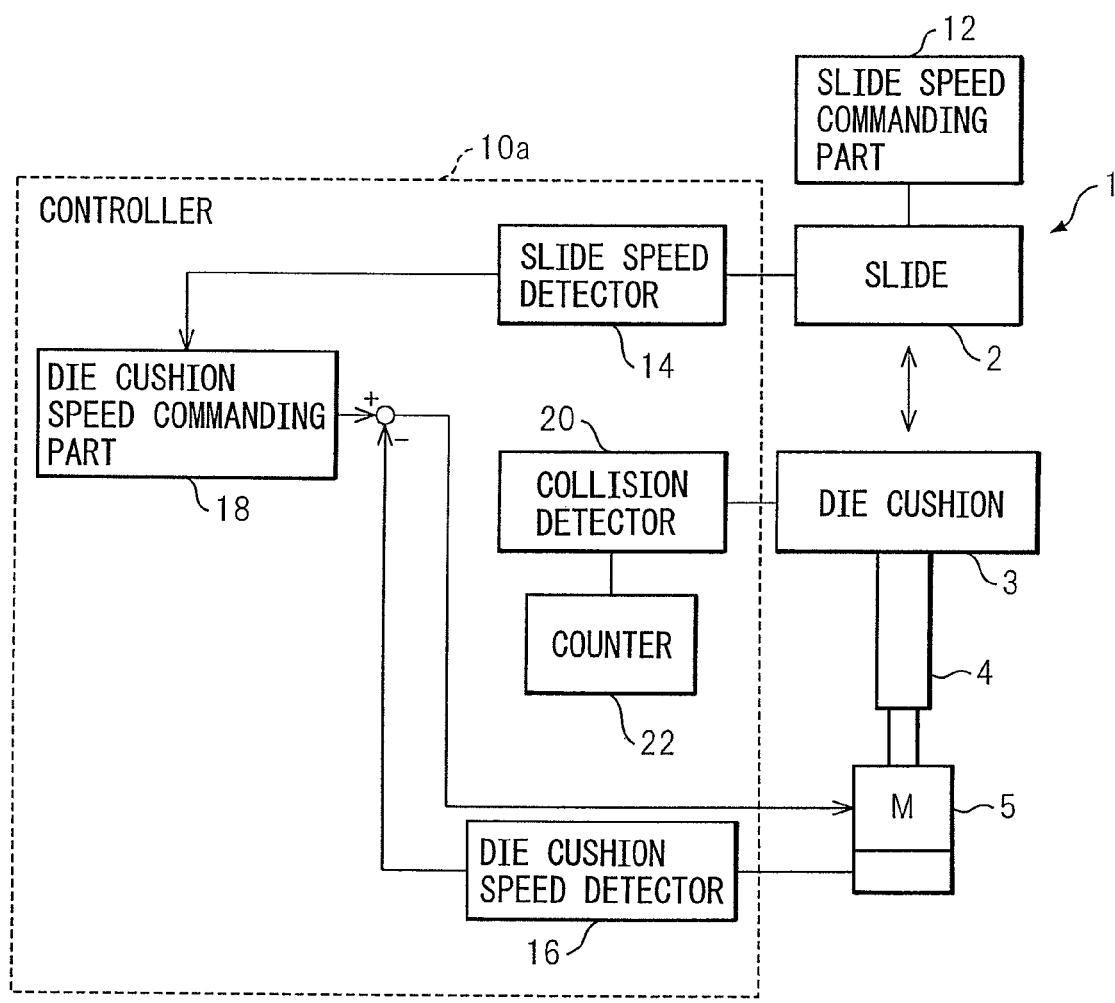
FIG. 6 shows a schematic configuration of a press machine including a control device for a servo die cushion according to a second embodiment of the invention.

FIG. 6 shows a schematic configuration of a press machine 1 including a control device or a controller 10a for a servo die cushion according to a second embodiment of the invention. The controller 10a includes a collision detecting part or detector 20 and a counter 22 for counting elapsed time after the detection by the detector 20, as well as the components of the controller 10 of the first embodiment.

Figure 7:
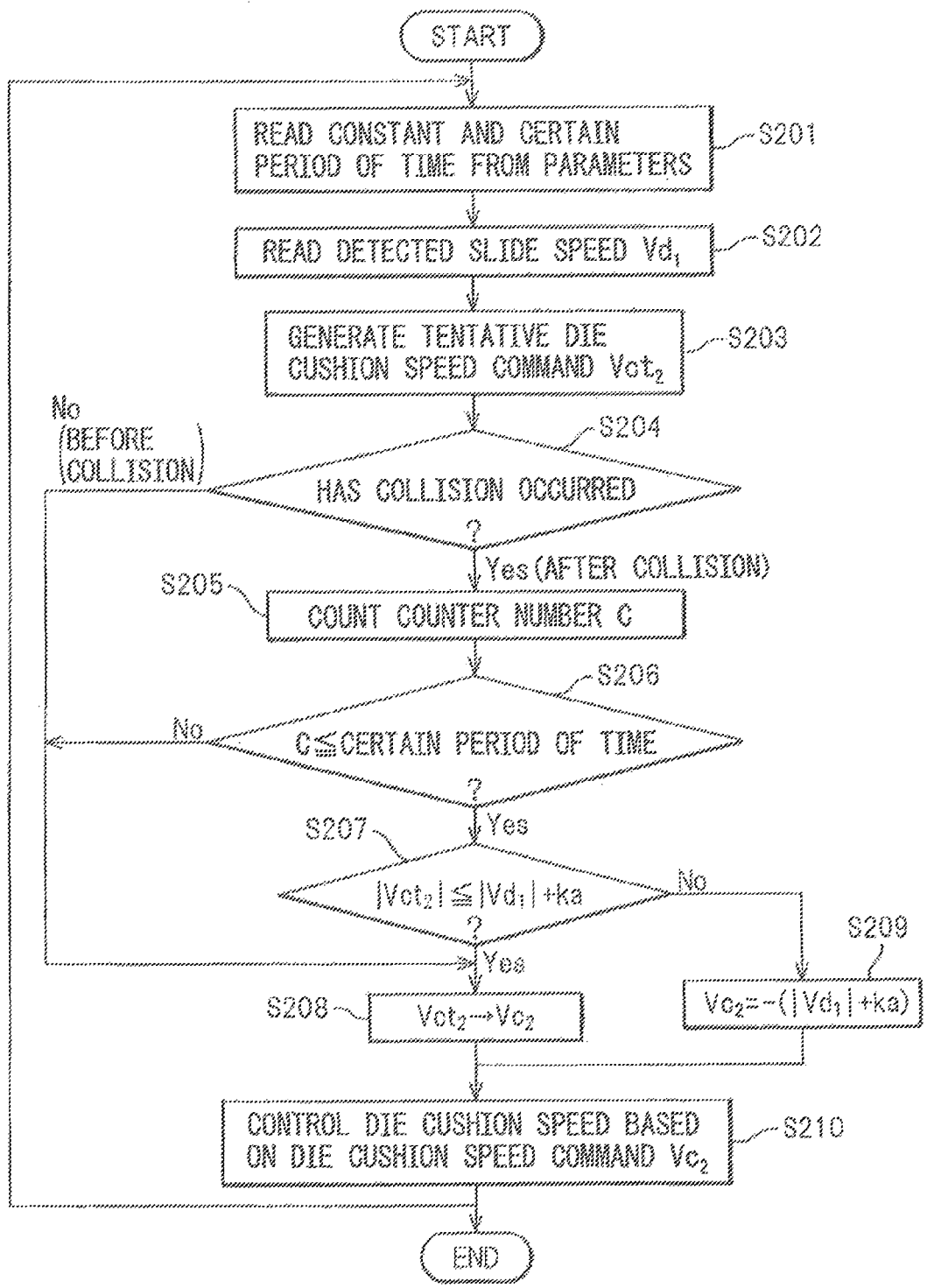
FIG. 7 is a flowchart showing a procedure of the control device of FIG. 6.

FIG. 7 is a flowchart showing a procedure of the controller 10a. First, in step S201, a positive parameter ka and a value regarding a certain elapsed time are read from parameters stored in the memory. Steps S202 and S203 may be the same as steps S102 and S103 of FIG. 2, respectively. In the next step S204, it is judged whether the slide has collided with the die cushion, by means of the collision detector 20. When the collision has occurred, the counting is started by the counter 22 (step S205). Then, if a counter number C is equal to or smaller than a certain number (or a period of time) (step S206), the procedure progresses to step S207, similar to step S104 of FIG. 2. The subsequent steps S208 to S210 are the same as steps S105 to S107 of FIG. 2. The certain counter number (or the period of time) means a period of time after the collision, in which the command speed of the die cushion should be limited, if necessary, by comparing the threshold with the absolute value of the command speed of the die cushion, rather than controlling the force error to zero as in the prior art. Such a counter number may be determined empirically. On the other hand, if the counter number C is larger than the certain number in step S206 (i.e., the certain period of time has passed from the collision), the procedure progresses to step S208, without comparing the threshold with the absolute value of the command speed of the die cushion, so as to perform conventional control. Therefore, the detected force may quickly converge with the command force, while preventing a problem in which the detected force is significantly smaller than the command force.

In the above embodiment, the command speed of the die cushion is limited, if the absolute value thereof is largely deviated from the value calculated by adding or multiplying the absolute value of the detected speed of the slide to or by the certain constant. At this point, as described regarding related art, the speed command value of the die cushion in the prior art or the invention is calculated by one of two equations below:

$$\text{die cushion command speed}=(\text{force error})\times(\text{force gain})+(\text{slide speed}) \quad (1)$$

$$\text{die cushion command speed}=(\text{force error})\times(\text{first force gain})+\Sigma(\text{force error})\times(\text{second force gain})+(\text{slide speed}) \quad (2)$$

In a third embodiment as described below, the command speed of the die cushion is limited by using the above equations, with the slide speed in equation (1) or (2) being multiplied by a constant smaller than one.

Figure 8:
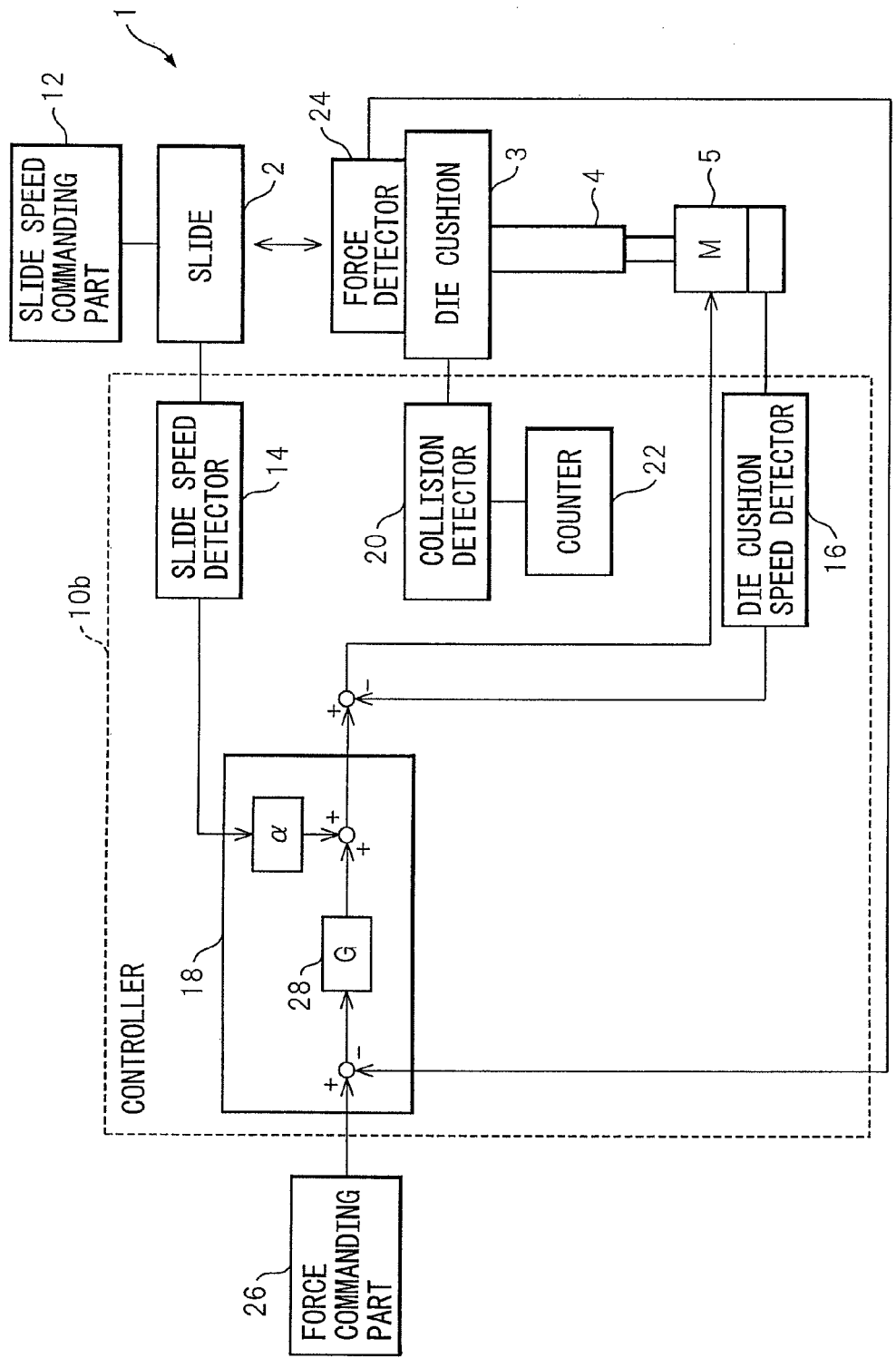
FIG. 8 shows a schematic configuration of a press machine including a control device for a servo die cushion according to a third embodiment of the invention.

FIG. 8 shows a schematic configuration of a press machine 1 including a control device or a controller 10b for a servo die cushion according to a third embodiment of the invention. The press machine 1 further includes a force detecting part or detector 24 for detecting a force applied to the die cushion 3 by means of the slide 2, and a force commanding part 26 for commanding a force to be generated between the slide 2 and the die cushion 3. The die cushion speed commanding part 18 includes a force gain 28 for calculating a tentative speed command based on a force error (or a value obtained by subtracting a detected force by the force detector 24 from a command force by the force commanding part 26).

Figure 9:
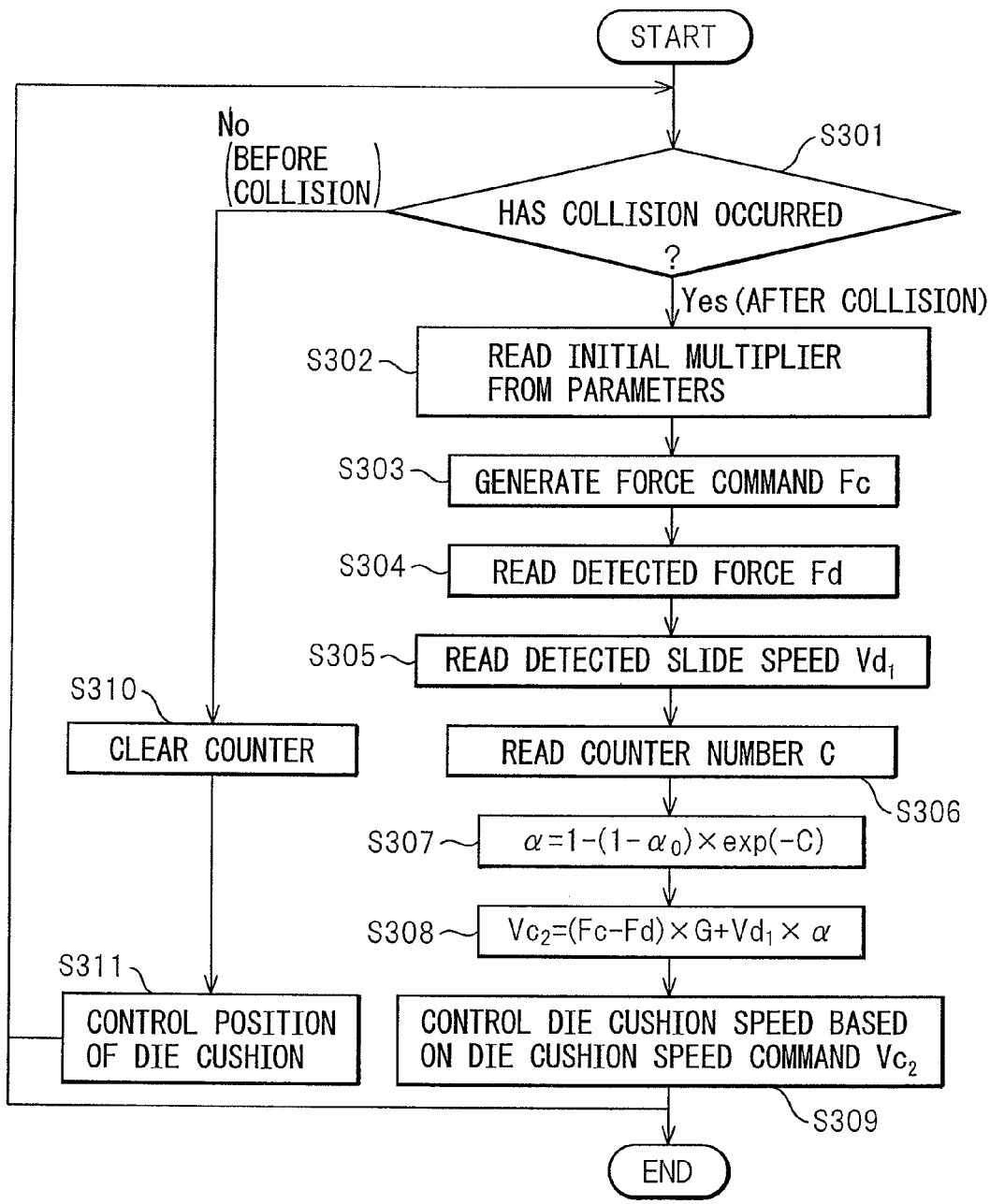
FIG. 9 is a flowchart showing a procedure of the control device of FIG. 8.

FIG. 9 is a flowchart showing a procedure of the controller 10b. First, if the collision between the slide and the die cushion is detected by the collision detector 20 in step S301, an initial multiplier $\alpha_0$ is read from parameters stored in the memory (step S302). Next, the force commanding part 26 generates an initial force command (step S303), and then, the force generated between the slide and the die cushion is detected by the force detector 24 as the detected force value (step S304). Further, the slide detected speed $Vd_1$, detected by the slide speed detector 14, is loaded (step S305).

Next, a counter number C or elapsed time after the collision is read by the counter 22 in step S306, and a multiplier $\alpha$ is determined in step S307. The multiplier $\alpha$ may be calculated, by using equation (3) below and the initial value $\alpha_0$ read in step S302.

$$\alpha = 1 - (1-\alpha_0) \times \exp(-C) \quad (3)$$

As is apparent from equation (3), the value $\alpha$ converges from the initial value $\alpha_0$ to one, as the counter value C increases.

In the next step S308, the speed command value $Vc_2$ of the die cushion is calculated, by using equation (4) below and the multiplier a determined in step S307. The die cushion is controlled based on this speed command (step S309).

$$Vc2 = (Fc-Fd) \times G + Vd_1 \times \alpha \quad (4)$$

where Fc, Fd and G are a command force value, a detected force value and a force gain, respectively.

Figure 10:
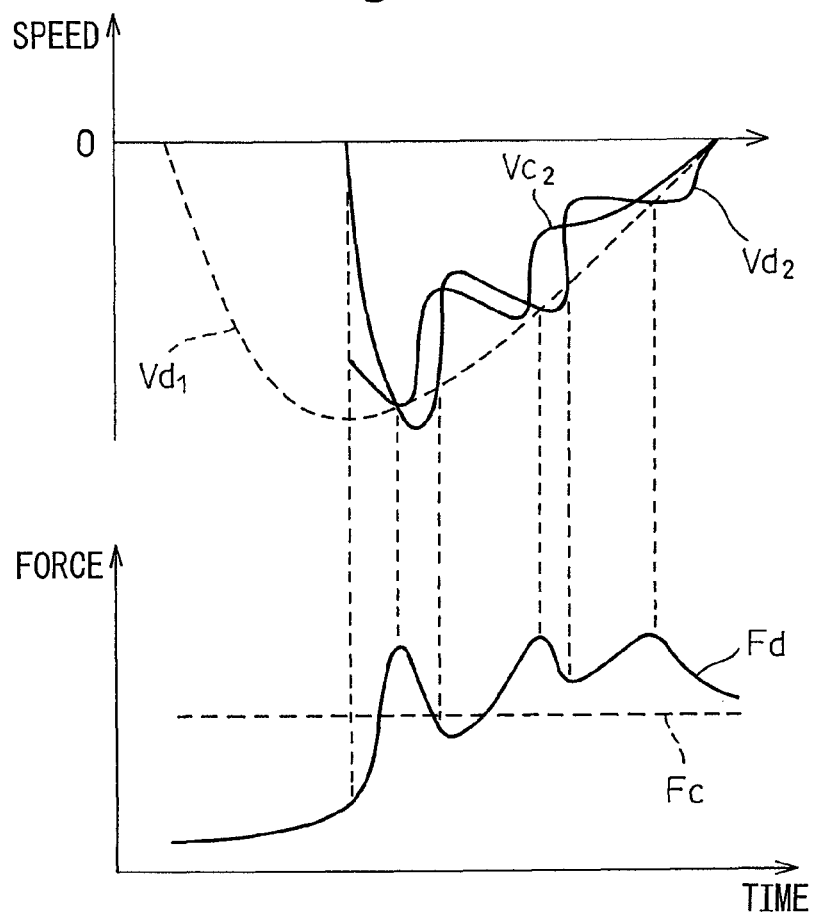
FIG. 10 is a graph showing the change of the detected speed of the die cushion and the detected force in the third embodiment.

FIG. 10 is a graph showing the change of the detected speed of the die cushion and the detected force when the controller 10b is used. The initial multiplier $\alpha_0$ is set to a suitable positive value smaller than one (for example, 0.7 to 0.9). By means of equation (4), in comparison with equation (1), since the detected slide speed is multiplied by the multiplier a smaller than one, the absolute value of the speed command value of the die cushion is set lower than that in the prior art. Accordingly, the absolute value of the actual speed (detected speed) of the die cushion also becomes smaller than that in the prior art, whereby undershoot of the detected force may be prevented. In addition, since the value $\alpha$ gradually converge with one, the detected force may smoothly converge with the command force. The initial value $\alpha_0$ may be determined empirically.

If the collision is not detected in step S301, the processes of steps S302 to S309 are unnecessary. Therefore, the procedure progresses to step S310 so as to clear the counter 22, and then, the position control of the die cushion is performed in a normal or conventional way (step S311).

Figure 11:
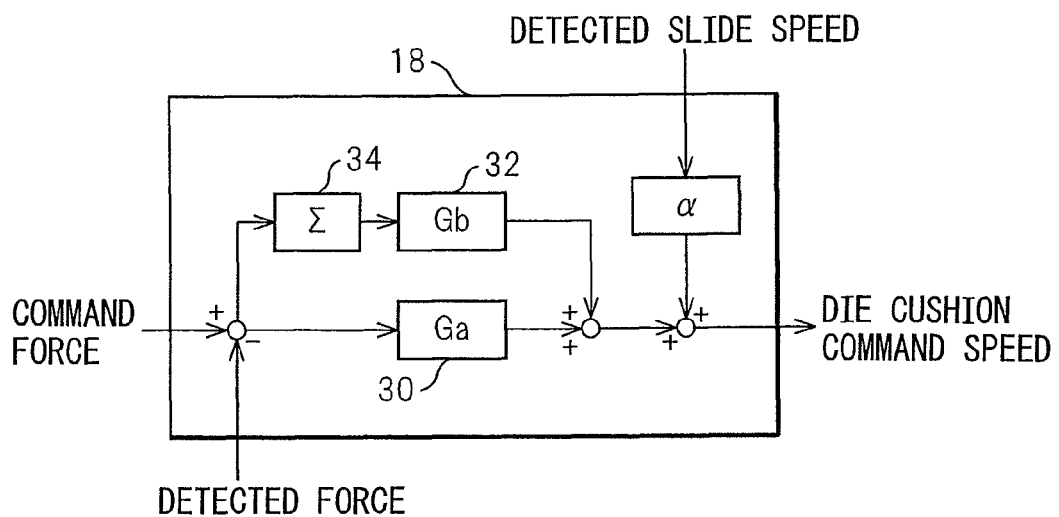
FIG. 11 shows a modification of the control device of FIG. 8.
Figure 12:
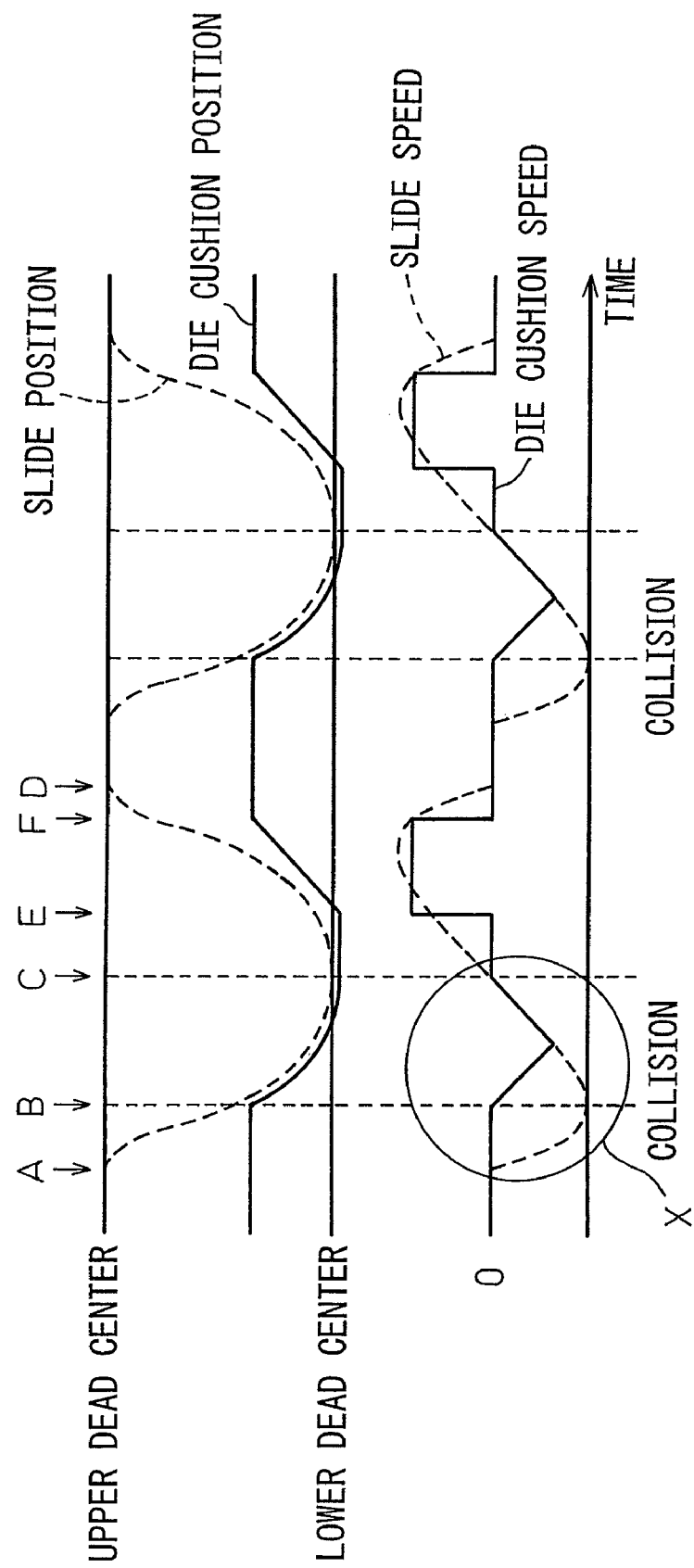
FIG. 12 is a graph showing ideal changes of the position and the speed of the slide and the die cushion in a normal machining operation.
Figure 13:
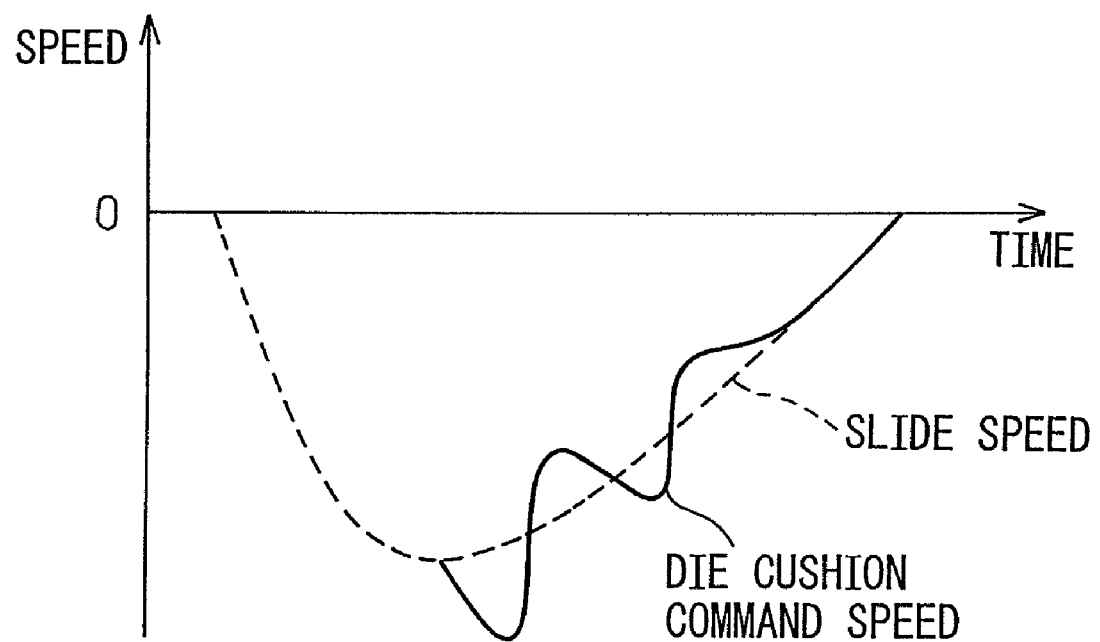
FIG. 13 is an enlarged view of FIG. 12, indicating a speed command value of the die cushion in the background art.

The speed command of the die cushion, generated in the speed commanding part 18 of the controller 10b, may be generated based on PI control of the force error. In this case, as shown in FIG. 11, the die cushion speed commanding part 18 has a first gain 30, a second gain 32 and an integrator 34. The equation in step S308 of FIG. 9 for calculating the command speed of the die cushion is modified, as shown in equation (5) below.

$$Vc2 = (Fc-Fd) \times Ga + \Sigma(Fc-Fd) \times Gb + Vd_1 \times \alpha \quad (5)$$

This equation (5) corresponds to the above equation (2), and therefore, the effect obtained by the multiplier $\alpha$ according to the invention may be the same as that of equation (4).

The tentative command speed of the die cushion, generated in the first and second embodiments, may also be generated in the configuration of FIG. 8, based on the force error. In the above embodiments, the detected slide speed is used as representing the slide speed. Alternatively, the slide command speed may be used when the speed of the slide is controlled by the slide speed commanding part 12, because the command speed and the detected speed of the slide are approximately coincide with each other.

According to the control device of the servo die cushion of the present invention, the speed of the die cushion after the collision is prevented from largely deviating from the speed of the slide. Therefore, even when the gain is large for a fast response, the press force between the slide and the die cushion is not significantly reduced.

Concretely, the above effect may be obtained by a simple way, in which the absolute value of the command speed of the die cushion is limited so as to not exceed the value calculated by adding or multiplying the absolute value of the slide speed to or by the positive constant.

Also, when the above limitation is performed only within a certain period time after the collision, the invention is applied only when the press force is likely to be reduced. After the certain period of time, the conventional control, by which the force error is controlled to be zero, may be applied.

Further, when the speed command of the die cushion is generated based on the summation of the product of the force gain and the force error and the product of the speed of the slide and the multiplier, the absolute value of the command speed of the die cushion may be suitably limited by setting the multiplier to a positive value smaller than one.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A control device for a servo die cushion, for controlling a die cushion which generates a force applied to a slide by using a servomotor as a driving source, the control device comprising:
    a force commanding part for commanding a force to be generated between the slide and the die cushion;
    a force detecting part for detecting a force generated between the slide and the die cushion;
    a slide speed detecting part for detecting a speed of the slide; and
    a die cushion speed commanding part for commanding a speed of the die cushion based on the force commanded by the force commanding part and the force detected by the force detecting part, wherein
    the die cushion speed commanding part is configured to calculate a threshold based on an absolute value of the speed of the slide detected by the slide speed detecting part and to generate a speed command of the die cushion such that an absolute value of the speed command of the die cushion is equal to or smaller than the threshold, and the die cushion speed commanding part is configured to calculate the threshold by adding a positive value to the absolute value of the detected speed of the slide.

2. A control device for a servo die cushion, for controlling a die cushion which generates a force applied to a slide by using a servomotor as a driving source, the control device comprising:
    a force commanding part for commanding a force to be generated between the slide and the die cushion;
    a force detecting part for detecting a force generated between the slide and the die cushion;
    a slide speed detecting part for detecting a speed of the slide; and a die cushion speed commanding part for commanding a speed of the die cushion based on the force commanded by the force commanding part and the force detected by the force detecting part, wherein the die cushion speed commanding part is configured to calculate a threshold based on an absolute value of the speed of the slide detected by the slide speed detecting part and to generate a speed command of the die cushion such that an absolute value of the speed command of the die cushion is equal to or smaller than the threshold, and the die cushion speed commanding part is configured to calculate the threshold by multiplying the absolute value of the detected speed of the slide by a constant larger than one.

3. The control device as set forth in claim 1, wherein the die cushion speed commanding part is configured to calculate the threshold for a predetermined period of time after a collision between the slide and the die cushion, and the die cushion speed commanding part is configured to calculate a value of the threshold that is equal to or slightly larger than the absolute value of the detected speed of the slide.

4. The control device as set forth in claim 1, wherein the die cushion speed commanding part is configured to generate the speed command of the die cushion based on the summation of the product of a force gain and a force error and the product of the detected speed of the slide and a multiplier, the force error is the difference between the force detected by the force detecting part and the force commanded by the force commanding part, and the die cushion speed commanding part is configured to set the multiplier to be smaller than one at a time of a collision between the slide and the die cushion and set the multiplier to converge toward one after the collision.

5. A control device for a servo die cushion, for controlling a die cushion which generates a force applied to a slide by using a servomotor as a driving source, the control device comprising:

a force commanding part for commanding a force to be generated between the slide and the die cushion;

a force detecting part for detecting a force generated between the slide and the die cushion;

a slide speed commanding part for generating a speed command of the slide based on the force commanded by the force commanding part and the force detected by the force detecting part; and a die cushion speed commanding part for commanding a speed of the die cushion, wherein the die cushion speed commanding part is configured to calculate a threshold based on an absolute value of the speed command of the slide generated by the slide speed commanding part and to generate a speed command of the die cushion such that an absolute value of the speed command of the die cushion is equal to or smaller than the threshold, and the die cushion speed commanding part is configured to calculate the threshold by adding a positive value to the absolute value of the speed command of the slide.

6. A control device for a servo die cushion, for controlling a die cushion which generates a force applied to a slide by using a servomotor as a driving source, the control device comprising:

a force commanding part for commanding a force to be generated between the slide and the die cushion;

a force detecting part for detecting a force generated between the slide and the die cushion;

a slide speed commanding part for generating a speed command of the slide based on the force commanded by the force commanding part and the force detected by the force detecting part; and a die cushion speed commanding part for commanding a speed of the die cushion, wherein the die cushion speed commanding part is configured to calculate a threshold based on an absolute value of the speed command of the slide generated by the slide speed commanding part and to generate a speed command of the die cushion such that an absolute value of the speed command of the die cushion is equal to or smaller than the threshold, and the die cushion speed commanding part is configured to calculate the threshold by multiplying the absolute value of the speed command of the slide by a constant larger than one.

7. The control device as set forth in claim 5, wherein the die cushion speed commanding part is configured to calculate the threshold for a predetermined period of time after a collision between the slide and the die cushion, and the die cushion speed commanding part is configured to calculate a value of the threshold that is equal to or slightly larger than the absolute value of the speed command of the slide.

8. The control device as set forth in claim 5, wherein the die cushion speed commanding part is configured to generate the speed command of the die cushion based on the summation of the product of a force gain and a force error and the product of the speed command of the slide and a multiplier, the force error is the difference between the force detected by the force detecting part and the force commanded by the force commanding part, and the die cushion speed commanding part is configured to set the multiplier to be smaller than one at a time of a collision between the slide and the die cushion and set the multiplier to converge toward one after the collision.

9. The control device as set forth in claim 2, wherein the die cushion speed commanding part is configured to calculate the threshold for a predetermined period of time after a collision between the slide and the die cushion, and the die cushion speed commanding part is configured to calculate a value of the threshold that is equal to or slightly larger than the absolute value of the detected speed of the slide.

10. The control device as set forth in claim 2, wherein the die cushion speed commanding part is configured to generate the speed command of the die cushion based on the summation of the product of a force gain and a force error and the product of the detected speed of the slide and a multiplier, the force error is the difference between the force detected by the force detecting part and the force commanded by the force commanding part, and the die cushion speed commanding part is configured to set the multiplier to be smaller than one at a time of a collision between the slide and the die cushion and set the multiplier to converge toward one after the collision.

11. The control device as set forth in claim 1, wherein the die cushion speed commanding part is configured to generate a tentative speed command based on the force commanded by the force commanding part and the force detected by the force detecting part and set the tentative speed command as the speed command of the die cushion when an absolute value of the tentative speed command is equal to or smaller than the threshold, and the die cushion speed commanding part is configured to set a value calculated by multiplying the threshold by minus one as the speed command of the die cushion when the absolute value of the tentative speed command is larger than the threshold.

12. The control device as set forth in claim 2, wherein the die cushion speed commanding part is configured to generate a tentative speed command based on the force commanded by the force commanding part and the force detected by the force detecting part and set the tentative speed command as the speed command of the die cushion when an absolute value of the tentative speed command is equal to or smaller than the threshold, and the die cushion speed commanding part is configured to set a value calculated by multiplying the threshold by minus one as the speed command of the die cushion when the absolute value of the tentative speed command is larger than the threshold.

13. The control device as set forth in claim 6, wherein the die cushion speed commanding part is configured to calculate the threshold for a predetermined period of time after a collision between the slide and the die cushion, and the die cushion speed commanding part is configured to calculate a value of the threshold that is equal to or slightly larger than the absolute value of the speed command of the slide.

14. The control device as set forth in claim 6, wherein the die cushion speed commanding part is configured to generate the speed command of the die cushion based on the summation of the product of a force gain and a force error and the product of the speed command of the slide and a multiplier, the force error is the difference between the force detected by the force detecting part and the force commanded by the force commanding part, and the die cushion speed commanding part is configured to set the multiplier to be smaller than one at a time of a collision between the slide and the die cushion and set the multiplier to converge toward one after the collision.

15. The control device as set forth in claim 5, wherein the die cushion speed commanding part is configured to generate a tentative speed command based on the force commanded by the force commanding part and the force detected by the force detecting part and set the tentative speed command as the speed command of the die cushion when an absolute value of the tentative speed command is equal to or smaller than the threshold, and the die cushion speed commanding part is configured to set a value calculated by multiplying the threshold by minus one as the speed command of the die cushion when the absolute value of the tentative speed command is larger than the threshold.

16. The control device as set forth in claim 6, wherein the die cushion speed commanding part is configured to generate a tentative speed command based on the force commanded by the force commanding part and the force detected by the force detecting part and set the tentative speed command as the speed command of the die cushion when an absolute value of the tentative speed command is equal to or smaller than the threshold, and the die cushion speed commanding part is configured to set a value calculated by multiplying the threshold by minus one as the speed command of the die cushion when the absolute value of the tentative speed command is larger than the threshold.

\* \* \* \* \*